May 25, 1943.   C. W. MOTT   2,320,191
DIAPHRAGM PRESSURE MOTOR
Filed Feb. 12, 1942

Inventor:
Earl W. Mott.
By Paul O. Pippel
Atty.

Patented May 25, 1943

2,320,191

UNITED STATES PATENT OFFICE 2,320,191

DIAPHRAGM PRESSURE MOTOR

Carl W. Mott, La Grange, Ill., assignor to International Harvester Company, a corporation of New Jersey Application February 12, 1942, Serial No. 430,655

4 Claims. (Cl. 121—48)

This invention relates to an improvement in a fluid-pressure motor and more particularly to a diaphragm type of motor.

The principal object of the invention is to provide an improved fluid-pressure motor of the diaphragm type.

Another object is to provide an improved means for connecting diaphragms within a fluid-pressure motor.

A still further object is to provide an improved means for protecting the diaphragms of a diaphragm type of motor from dirt and other foreign substances.

According to the present invention, a housing is formed with a chamber which is enclosed by a pair of diaphragms. A pair of relatively movable sleeve members extend within the housing and are respectively connected to the diaphragms. One of the sleeve members rigidly carries a shaft which serves as a pilot means for the other sleeve member during movement thereof. Conduit means is provided for causing fluid to enter or leave the chamber for moving the diaphragms to their expanded or contracted positions.

For other objects and for a better understanding of the invention, reference may be had to the following detailed description taken in conjunction with the accompanying sheet of drawings, in which.

Figure 1:
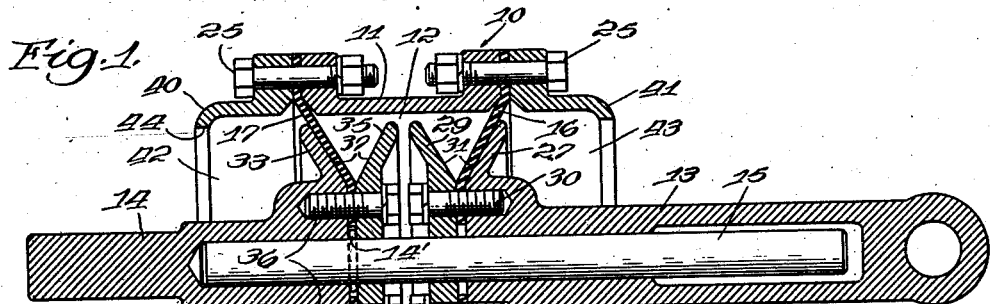
Figure 1 is a sectional view through a fluid pressure motor of the diaphragm type, showing the diaphragms in their contracted positions.

Referring now to the drawing, there is shown a fluid-pressure motor generally designated at 10 with a housing 11 having a chamber 12. Extending within the chamber 12 are a pair of relatively movable sleeve members 13 and 14. Connected to the sleeve 14 by a pin 14' is a shaft 15 which serves to pilot the sleeve members 13 and 14 in axial alinement upon relative movement thereof. The chamber 12 is respectively enclosed at each end by diaphragms 16 and 17. The outer portions of the diaphragms are respectively secured to flanged portions 19 and 20 on the housing 11 by securing means generally designated at 21 and 22. The securing means 21 and 22 include flanged portions 23 and 24 which cooperate with the flanged portions 19 and 20 and are held together by threaded bolt means 25. The securing means 21 and 22 thus described cooperating with the diaphragms 16 and 17 provide positive means for preventing leakage of fluid from the chamber 12.

For securing the inner portion of the diaphragm 16 to the sleeve member 13, said sleeve member is provided with an enlarged annular portion 26 having a flared edge 27. A collar 28 having a flared edge 29 clamps the diaphragm 16 to the annular portion 26 by means of threaded bolts 30. The flared edges 27 and 29 form diverging surfaces 31, between which the diaphragm 16 is connected.

For securing the inner portion of the diaphragm 17 to the sleeve member 14, said sleeve member 14 is provided with an enlarged annular portion 32 having a flared edge 33. A collar 34 having a flared edge 35 clamps the diaphragm 17 to the annular portion 26 by means of threaded bolts 36. The flared edges 33 and 35 form diverging surfaces 37, between which the diaphragm 17 is connected.

A conduit means 38 is connected to the housing 11 as shown at 39 and allows fluid to enter and leave the chamber 12 for moving the diaphragms either to their expanded or contracted position.

Figure 2:
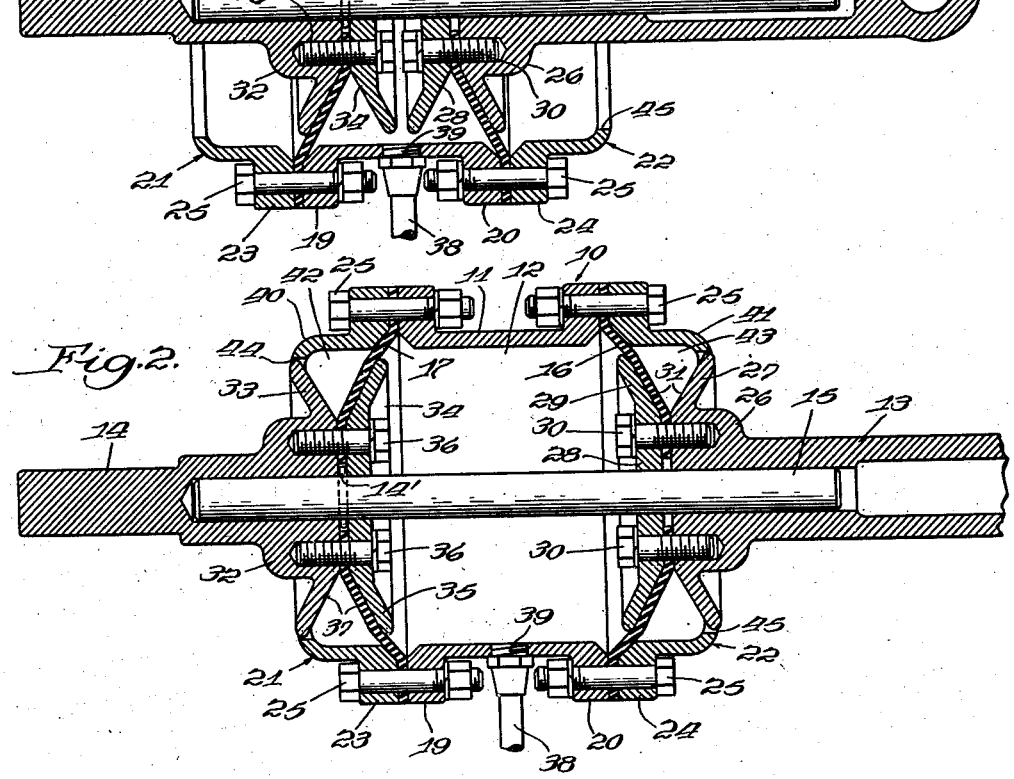
Figure 2 is a sectional view through a fluid-pressure motor of the diaphragm type, showing the diaphragms in their extended positions.

The securing means 21 and 22 are respectively provided with cylindrical portions 40 and 41 which form chambers 42 and 43 into which the diaphragms 16 and 17 move when they are expanded, as best shown in Figure 2. The cylindrical portions 40 and 41 are respectively provided with annular openings 44 and 45. When the diaphragms 16 and 17 are expanded, the flared edge 27 of the enlarged portions 26 and the flared edge 33 of the enlarged portion 32 respectively cooperate with the openings 45 and 44 to enclose the diaphragms against dirt and other foreign substances when in this position and thus prevent deterioration of the diaphragms and subsequent fluid leakage from the chamber 12.

When in the contracted positions, the diaphragms 16 and 17, as shown in Figure 1, are substantially within the chamber 12. In these positions the flared edges 27 and 33 again act to prevent exposure of the diaphragms to dirt and other foreign substances, this result being obtained by the fact that the greater portions of the diaphragms are substantially covered by the flared edges 27 and 33 of the enlarged portions 26 and 32. The diverging surfaces 31 and 37 formed by the flared edges 27 and 29, and 33 and 35 act as means for limiting movement of the diaphragms 16 and 17 when they are expanded or contracted. Thus, distortion or stretching of the diaphragms is prevented upon movement of the same, and a fluid tight means is provided for securing the diaphragms to the sleeve members 14 and 15.

Upon relative movement of the sleeve members 13 and 14, the shaft 16 acts as a pilot to keep the sleeve members in axial alinement and to provide for a relatively long working stroke of a compact fluid-pressure motor 10.

Figure 3:
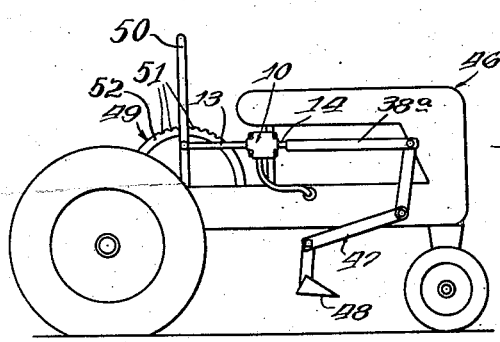
Figure 3 is an elevational view of a tractor having an agricultural implement mounted thereon and showing a fluid-pressure motor connected thereto for actuating the movable parts of the implement.

As shown in Figure 3, the fluid-pressure motor 10 is connected to a tractor 46 having an implement rig 47 mounted thereon. The implement rig 47 includes a ground-working tool 48 which is movable to and from a ground-working position. The fluid-pressure motor 10 is connected to the tractor 46 by means of the sleeve 13 connected at one end to a manually operated adjusting mechanism, generally designated at 49, including a lever 50 pivotal at its lower end for adapting it to be selectively set at the notches 51 in the adjustment segment 52 for said lever. Thus, the lever 50 serves as an adjustable reaction anchorage for the motor. The sleeve 14 of the fluid-pressure motor 10 is connected to a lifting pipe 38a which is in turn connected to the implement rig 47 for lifting and lowering the ground-working tool 48. As shown in Figure 3, the fluid-pressure motor 10 has operated to move the tool 48 out of the ground and the diaphragms 16 and 17 are in their expanded positions, as shown in Figure 2. In order to lower the tool 48 back into the ground, fluid is allowed to leave the chamber 12 and the diaphragms 16 and 17 take their positions, as shown in Figure 1.

While various changes may be made in the detail construction of the present invention, it shall be understood that such changes shall be within the spirit and scope of the present invention as defined by the appended claims.

What is claimed is:

1. In combination, a housing having a chamber, a sleeve member extending within said chamber and having a shaft rigidly carried thereon, a second sleeve member slidably carried by the shaft for horizontal movement with respect to the housing, a flared portion at one end of each of the sleeve members, diaphragms respectively abutting each of the flared portions, a flared collar engaging the inner portions of each of the diaphragms, and threaded means for securing the collars and the diaphragms to the sleeve members, peripheral flanges on each end of the housing, means for respectively securing the diaphragms to the flanges including a pair of annular flanged members enclosing the flared portions on the sleeve members, and conduit means for delivering fluid to and from the chamber formed by the housing and the diaphragms to move the sleeve members with respect to the housing.

2. In combination, a housing having a chamber, a sleeve member extending within said chamber and having a pilot shaft carried thereon, a second sleeve member slidably carried on the shaft for movement with respect to the first sleeve member, an annular V-shaped portion at one end of each of the sleeve members, a diaphragm connected at the vertex of each of the respective V-shaped portions, a flange at each end of the housing, means for securing a diaphragm to each of the flanges for enclosing the ends of the chamber, and means for conducting fluid to the chamber to expand the diaphragms to move one sleeve member with respect to the other.

3. In combination, a housing having a chamber, a sleeve member extending within said chamber and having a shaft carried thereon, a second sleeve member slidably carried on the shaft for movement with respect to the first sleeve member, an annular V-shaped portion at one end of each of the sleeve members, a diaphragm respectively connected at the vertex of each of the V-shaped portions, a flange at each end of the housing, means for respectively securing a diaphragm to each of the flanges for enclosing the ends of the chamber including a pair of cylindrical portions, conduit means for delivering fluid to and from the chamber for moving the diaphragms whereby the cylindrical portions serve to enclose the V-shaped portions.

4. In combination, a housing having a chamber, a first sleeve member disposed within the chamber and having a shaft carried thereon, a second sleeve member slidably carried on the shaft for relative movement with respect to the first sleeve member, an annular part at one end of the first sleeve member, a diaphragm secured to the annular part and also secured to the housing for enclosing the chamber, an annular part at one end of the second sleeve member, a diaphragm secured to said annular part and also secured to the housing for enclosing the chamber, means for conducting fluid to and from the chamber for moving the diaphragms, diverging side portions on each of the annular parts for limiting movement of the diaphragms, and means at each end of the housing for respectively enclosing the diaphragm and the annular parts.

CARL W. MOTT.